April 22, 1969  W. OLSEN ET AL  3,440,381
ELECTRIC SWITCH ACTUATED BY A CRANK-FLEXIBLE STRAND DEVICE
Filed Dec. 14, 1966
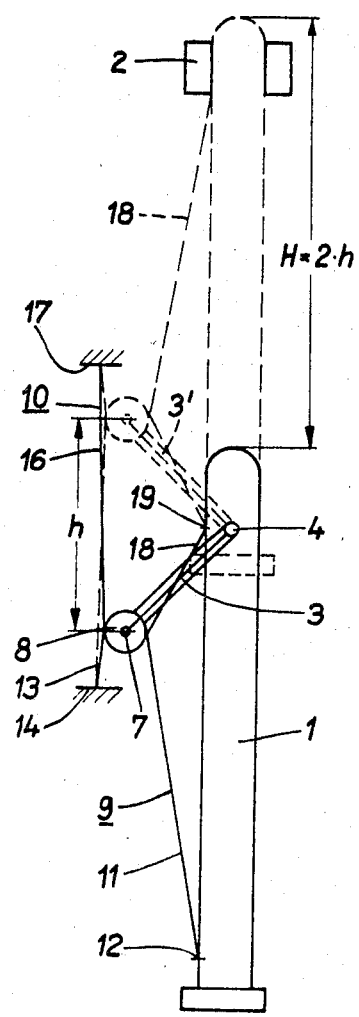
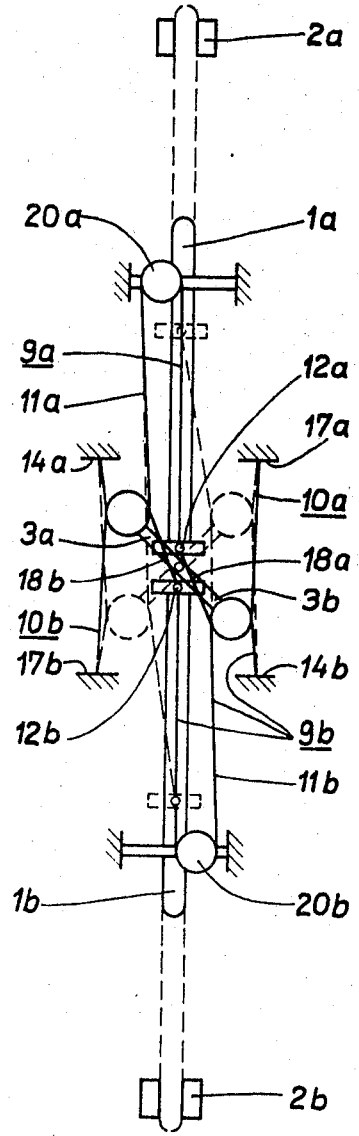

United States Patent Office 3,440,381
Patented Apr. 22, 1969

3,440,381
ELECTRIC SWITCH ACTUATED BY A CRANK-FLEXIBLE STRAND DEVICE
Willi Olsen, Siegfried Ochla, and Manfred Lieske, Berlin, Germany, assignors to Siemens Aktiengesellschaft, Berlin, Germany, a corporation of Germany
Filed Dec. 14, 1966, Ser. No. 601,817
Claims priority, application Germany, Dec. 15, 1965, S 10,098
Int. Cl. H01h *15/10, 17/16*
U.S. Cl. 200—163                                3 Claims

ABSTRACT OF THE DISCLOSURE

Electric switch having a movable switch member connected to an actuating crank by a connecting link transmission device in the form of a flexible strand or cable disposed around the crank pin, one end of the strand being secured to the movable switch member and the other end thereof to a stationary suspension point.

---

Our invention relates to electric switches.

With most electric high voltage switches, the movable switch member is actuated by a crank having a shaft which is set in motion for example by a compressed air drive mechanism. If the movable switch member is to be displaced rectilinearly, which is frequently the case, a connecting link must be interposed between the crank and the switch member so as to adjust for the deviation between the circular path of the crank and the rectilinear path of the switch member. In a known power switch this connecting link is supported on stationary components so that a crank drive with a double dead center with a transmission between the crank path and the path of the switch member is produced. The expense for machining and accurate assembly necessary therefor, is undesirably large, however, and precludes the use thereof for simple switches which must be produced as inexpensively as possible.

It is accordingly an object of our invention to provide electric switch which requires a minimum of machining and of accurate assembly, thereby reducing the cost of its manufacture.

With the foregoining and other objects in view, we provide in accordance with the invention, an electric switch wherein the movable switch member is actuated by a crank through the intermediary of a connecting link which produces a transmission therebetween. With relatively simple means a large transmission ratio is obtained whereby the path traced by the crank is able to be kept small. This is particularly advantageous for disconnect switches of the sliding type which are employed in fully-insulated encapsulated high voltage switch installations, because a small crank path permits the encapsulation to have small dimensions.

According to our invention, the connecting link is a flexible strand such as a rope or cable disposed around a pin of the crank, one end of the flexible strand being fixed to a movable switch member and the other end thereof being fixed to a stationary suspension point. A transmission ratio of 1:2 is thus obtained. This effect is quite the same for a cable-wound cylinder, in that each movement of the crank pin has an effect upon both ends of the flexible strand looped about the pin and therefore, when one end of the flexible strand is fixed, effects a doubling of the distance moved by the other end of the flexible strand. The natural flexibility of the strand readily adjusts for any manufacturing tolerances so that the production and assembly of the component portions are therefore relatively less complicated.

The use heretofore of ropes or cables for actuating the switch member of electric switches has only been to transmit tensile forces, so that those heretofore known electrical switches employing ropes or cables for actuating the switch member have nothing whatsoever to do with the basic concepts of our invention.

In accordance with more specific features of our invention, we provide an electric switch wherein the pin of the crank is coordinated with two flexible strands that are respectively fixed to a location on the movable switch member and to a stationary suspension point so that they cooperate with the pin on opposite sides. In this case, the movable switch member can be actuated in both rectilinear directions by means of the flexible strands, the respective strand actuating the movement of the switch member being stressed in tension while the other strand is pulled along by the movable switch member. One can manage however with only one flexible strand by effecting the motion with a spring, for example, in that direction of movement of the switch member in which the single flexible strand cannot be effective for actuating the switch member. The spring can be subjected to tension during the switching operation carried out with the single flexible strand. It then furthermore accomplishes the objective of keeping the flexible strand constantly under tension.

In accordance with other features of our invention, we provide another embodiment which is characterized by a stationary roller for reversing the end of the flexible strand secured to the switch member. Greater freedom is thereby achieved in the selection of the location at which the flexible strand is to be secured to the switch member so that it can be better accommodated to structural requirements. Instead of the roller, a stationary pin can also be used if friction is not too great. Correspondingly, the pin on the crank shaft can be provided with rollers which reduce the friction.

In accordance with yet additional features of our invention, the switch has symmetrical construction with two oppositely movable switch members.

Other features which are considered as characteristic for the invention are set forth in the appended claims.

Although the invention is illustrated and described as embodied in electric switch, it is nevertheless not intended to be limited to the details shown, since various modifications and structural changes may be made therein without departing from the spirit of the invention and within the scope and range of equivalence of the claims.

The construction and method of operation of the invention, however, together with additional objects and advantages thereof, will be best understood from the following description of specific embodiments when read in connection with the accompanying drawings, in which:

FIGS. 1 and 2 are simplified diagrammatic views of two embodiments of the electric switch constructed in accordance with or invention.

Referring now to the drawings and first particularly to FIG. 1 thereof, there is provided a high voltage disconnect switch of the slide type having a rectilinearly movable switch pin 1, which, in the dotted or phantom switched-on position, is connected with a stationary switch member 2. A crank 3 is provided for actuating the switch pin 1, the crank being seated on a shaft 4. The shaft 4 is mounted in a non-illustrated graunded metal capsule containing a substance having a high insulating value, such as sulphur hexafluoride ($SF_6$), for example. A non-illustrated drive mechanism is connected to the shaft 4 outside of the capsule for moving the crank 3 from the switched-off location of the crank 3 shown in solid lines to the switched-on position of the crank 3' shown in dotted lines or phantom.

The crank 3 carries a pin 7 at its free end, two rollers 8 being mounted thereon. Both rollers 8 are aligned with one another so that, as viewed in FIG. 1, only one of the rollers can be seen. A flexible strand such as a rope or cable 9, 10 is respectively looped about each of the two rollers 8, and acts as connecting links between the crank 3 and the switch pin 1.

The end 11 of the flexible strand 9 is secured at 12 to the end of the switch pin 1 which is most distant from the stationary switch member 2. The other end 13 of the flexible strand 9 is secured to a stationary suspension point 14. The flexible strand 9 consequently lies on the portion of the circumference of the roller 8 which is on that side of the pin 7 that faces toward the stationary switch member 2.

The second flexible strand 10 lies on the portion of the circumference of the other roller 8 located on the side of the pin 7 which faces away from the stationary switch member 2, because the end 16 of the flexible strand 10 is secured to a stationary suspension point 17 located opposite to the suspension point 14, while the other end 18 of the flexible strand 10 is fixed to the end of the switch pin 1 at 19 which is closer to the stationary switch member 2.

To place the switch in switched-on position, the crank 3 is moved into the dotted or phantom position 3' shown in FIG. 1. The end 11 of the flexible strand 9, which is secured at 12 to the switch pin 1, is carried along by the crank as it is moved into the position 3' thereof. This movement takes a course that is a reversal of the movement of the known cable-wound cylinder and is substantially twice as rapid as the rectilinear lift or travel $h$ occurring between both final positions 3, 3' of the crank. Consequently, the switch pin 1 is displaced a travel distance $H=2h$ discounting small deviations which occur due to the fact that the ends 11, 13 of the flexible strand 9 are not perfectly parallel to the switch pin axis. The flexible strand 10 follows after the crank 3 as the switch pin 1 is moved into the switched-on position represented by the dotted lines.

Switching off the electric switch is effected by the flexible strand 10 while the flexible strand 9 is being pulled back by the switch pin 1. The same speed transmission is produced thereby and the distance H travelled by the switch pin 1 is twice as long as the crank travel $h$. The angle through which the crank acts is 90°. Therefore, conventional drive mechanisms can be used. Nevertheless, the lateral working radius or radial extension of the drive mechanism linkage which is determined essentially by the length of the crank 3, is very small when compared to the travel distance H of the switch pin.

The switch shown in FIG. 2 actually comprises two disconnect switches similar in construction to that of FIG. 1, which are arranged symmetrical to one another so that the switch pins 1a and 1b, cooperating respectively with the stationary switch members 2a and 2b, move opposite to one another. The crank is in the form of a double crank having two arms 3a and 3b. The double crank is located intermediate the switch pins 1a and 1b, i.e. at the inner adjacent ends thereof. This construction is made possible by a stationary roller 20a, 20b respectively for each of the movable switch pins, with the ends 11a, 11b of one flexible strand fixed to the switch pin 1a, 1b respectively, so that it can be secured at the same point 12a, 12b of the switch pin 1a, 1b, at which the ends 18a, 18b of the flexible strand 10a, 10b, that are provided for effecting the opposite movement of the respective switch pins, are also secured.

As FIG. 2 clearly shows, the flexible strand 10a of the switch pin 1a provided for the switching-off operation, is not associated with the same crank arm 3a as the ffexible strand 9a provided for the switching-on operation, but rather, with the crank arm 3b lying in a position which is a mirror image of the crank arm 3a. Correspondingly, the flexible strand 9b is associated with the crank arm 3b whereas the flexible strand 10b on the other hand is associated with the crank arm 3a. This arrangement is selected so that the strand ends for the one switch pin 1a do not, therefore, cross the strand ends for the other switch pin 1b. However, such an arrangement is not absolutely necessary. Moreover, the mirror image arrangement of the crank arm 3a, 3b can also be provided, if only one switch pin is available for actuation.

It is further possible within the scope of our invention to employ several strand loops around the pin 7 instead of only looping the strand once around the pin, just as for a pulley block whereby, depending upon the number of the pins, which can be provided with rollers to reduce friction, a large transmission ratio is obtainable.

The embodiments of the disconnect switches of the slide type disclosed herein are particularly suitable for fully insulated high voltage switch installations because, due to the transmission ratio, a small crank arm is sufficient for a large switch pin travel distance, and only a small space located in a direction transverse to the switch pin axis is required therefor. The encapsulation necessary for providing insulation, which, for example, contains a gas under pressure can be kept relatively small with the novel drive mechanism of our invention. The invention is however, also utilizable advantageously if one is not so much concerned with dimensions but rather with obtaining a large switch pin speed for a small crank speed. Moreover, the flexibility of the strand, which can preferably be in the form of steel cables and in some cases can consist of cables formed of insulating plastic material, permits an advantageous accommodation to the construction factor or demands at a specific installation.

We claim:

1. Electric high-voltage switch, comprising a movable switch member, crank means for actuating said movable switch member, a connecting link interconnecting said movable switch member and said crank means for transmitting movement to said switch member from said crank means, said crank means including a crank pin, said connecting link being a flexible strand disposed about said crank pin and secured at one end to said movable switch member and at the other end to a stationary suspension point, and another connecting link in the form of a flexible strand, said other flexible strand being also secured at one end to said movable switch member and at the other end to a stationary suspension point, both of said flexible strands being looped about said crank pin at substantially diametrically opposite sides thereof.

2. Electric high voltage switch comprising a movable switch member, crank means for actuating said movable switch member, a connecting link interconnecting said movable switch member and said crank means for transmiting movement to said switch member from said crank means, said crank means including a crank pin, said connecting link being a flexible strand disposed about said crank pin and secured at one end to said movable swtich member and at the other end to a stationary suspension point, and including stationary roller means, said strand end secured to said movable switch members being reversingly looped about said stationary roller means between said switch member and said crank means.

3. Electric high-voltage switch of substantially symmetrical construction comprising two switch members movable in opposite directions, crank means for actuating said movable switch members, and a connecting link interconnecting each of said movable switch members and said crank means for transmitting movement to the respective switch member from said crank means, said crank means including a crank pin, and said connecting link being a flexible strand disposed about said crank pin and secured at one end to the respective movable switch member and at the other end to a stationary suspension point.

References Cited

UNITED STATES PATENTS

| | | | |
|---|---|---|---|
| 969,676 | 9/1910 | Tomlinson | 200—163 |
| 2,476,114 | 7/1912 | Regan | 200—163 |
| 2,810,808 | 10/1957 | Coggeshall | 200—161 |

ROBERT K. SCHAEFER, *Primary Examiner.*

H. BURKS, *Assistant Examiner.*

U.S. DEPARTMENT OF COMMERCE

PATENT OFFICE

Washington, D.C. 20231

UNITED STATES PATENT OFFICE
CERTIFICATE OF CORRECTION

Patent No. 3,440,381                                              April 22, 1969

Willi Olsen et al.

It is certified that error appears in the above identified patent and that said Letters Patent are hereby corrected as shown below:

In the heading to the printed specification, line 9, "S 10,098" should read -- S 100,983 --.

Signed and sealed this 21st day of April 1970.

(SEAL)
Attest:

Edward M. Fletcher, Jr.                              WILLIAM E. SCHUYLER, JR.
Attesting Officer                                               Commissioner of Patents